Dec. 6, 1960
R. D. CUMMINS
2,963,034
ANEROID VALVE FOR MAINTAINING A MINIMUM PRESSURE
Filed July 1, 1957
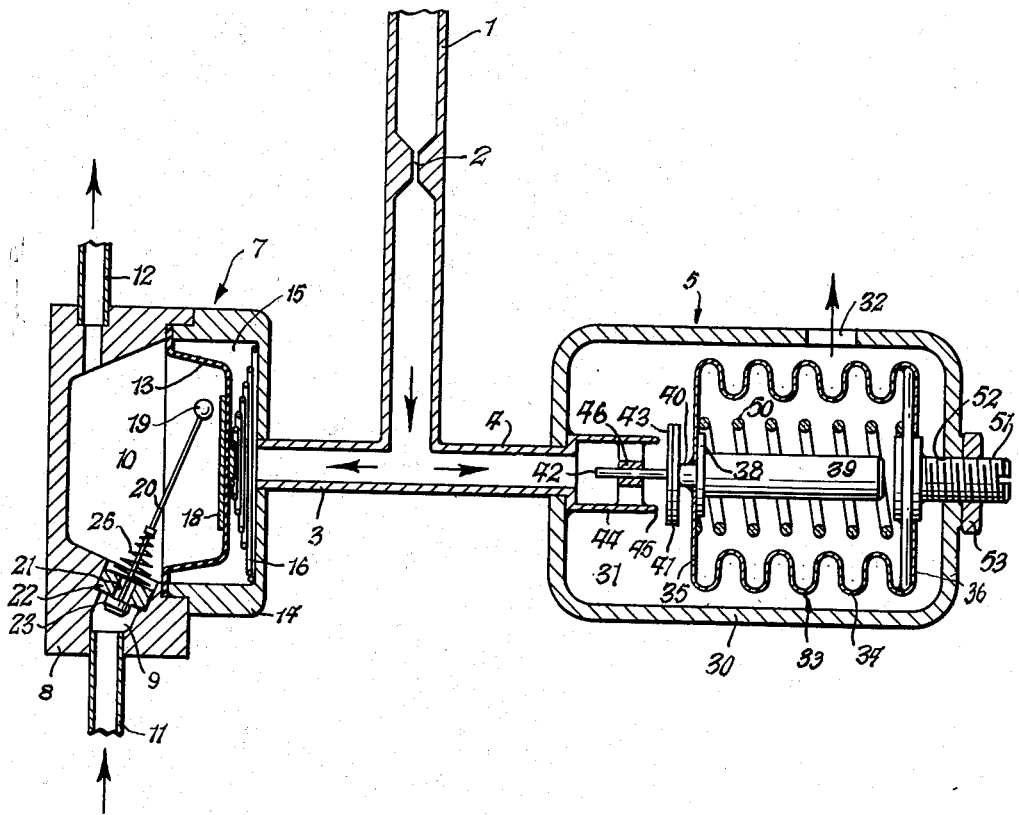
INVENTOR.
Richard D. Cummins
BY
Popp and Sommer
Attorneys.

United States Patent Office 2,963,034
Patented Dec. 6, 1960

2,963,034

ANEROID VALVE FOR MAINTAINING A MINIMUM PRESSURE

Richard D. Cummins, Tonawanda, N.Y., assignor to Firewel Development Company, Buffalo, N.Y., a co-partnership Filed July 1, 1957, Ser. No. 669,365

1 Claim. (Cl. 137—64)

This invention relates to an aneroid valve and more particularly to an aneroid valve used in maintaining a minimum reference pressure in oxygen breathing or suit pressure apparatus.

As disclosed in greater detail in the co-pending application of the late Philip E. Meidenbauer, Jr., Serial No. 413,305, filed March 1, 1954, now Patent 2,867,227, dated January 6, 1959, for Differential Pressure Gas Supplying Apparatus, in flying at high altitudes the pressure of 3.4 p.s.i.a. (pounds per square inch absolute) represents a critical value below which the aviator cannot go without pressure protection for his body since below this 3.4 p.s.i.a. a person's blood will boil at normal temperatures. 3.4 p.s.i.a. corresponds to an altitude of about 35,000 feet. This protection can be provided by a pressurized cabin or pressure suit and oxygen helmet, but in either event a minimum reference pressure must be artificially maintained to insure proper suit and oxygen breathing pressure during such high altitude flying. This reference pressure is generally the minimum pressure of 3.4 p.s.i.a. and it will be assumed that the aneroid valve of the present invention is designed to maintain a minimum reference pressure of 3.4 p.s.i.a. for oxygen breathing or pressure suits at altitudes of 35,000 feet or higher, the apparatus being referred to ambient pressure when flying below this altitude.

When aneroid valves for this purpose as disclosed in the said Meidenbauer application the maintenance of this reference pressure was a function of an evacuated bellows which, when subjected to decreasing ambient pressures expanded to close a vent and to permit a build-up of pressure from a supply of oxygen constantly being bled into the chamber surrounding the bellows. Such bellows were internally biased toward an expanded condition and hence in the event of puncturing the evacuated bellows the bellows expanded to cut off the vent to the atmosphere and permit the full pressure of the oxygen supply to build up in the breathing apparatus and the pressure suit to a point where such pressure ruptured diaphragms of the apparatus and rendered it inoperative or blew out the pressure suit.

It is the object of the present invention to provide an aneroid valve for the above purpose which, in the event of puncturing the bellows, will not permit the build up of excessive pressures in oxygen breathing apparatus or pressure suits but will limit such pressure to a safe value for the apparatus being served.

Another object is to provide such an aneroid valve which will function efficiently to maintain a minimum reference pressure for oxygen breathing apparatus or pressure suits at altitudes above 35,000 feet.

Another object is to provide such an aneroid valve which is sensitive in its operation and at the same time is rugged in construction and will not get out of order under conditions of severe and constant use.

Other objects and advantages of the invention will be apparent from the following description and drawing which represents a longitudinal central section through an aneroid valve embodying the present invention and showing the same associated with a source of oxygen under pressure and with a demand valve forming part of either oxygen breathing apparatus or apparatus for pressurizing the aviator's suit, or both.

In the drawing there is schematically illustrated a supply line 1 for gas under high pressure, say oxygen at 70 pound gage pressure, this supply line containing a restricted orifice 2 so that only a small amount of oxygen passes through the line 1, this small amount of oxygen being constantly bled through this orifice. The oxygen bled through the restricted orifice 2 passes either through a branch 3 to a demand valve indicated at 7 or through a branch 4 to the aneroid valve 5 embodying the present invention.

The demand valve is conventionally illustrated as including a valve body 8 having a bore 9 leading to a demand chamber 10 therein and the other end of the bore 9 being connected to a high pressure oxygen supply line 11. An outlet line 12 can lead to the aviator's mask (not shown) and can also control the pressure of his pressure suit. The demand chamber is closed by a flexible diaphragm 13 the edges of which are clamped against the rim of the valve body 8 by a cap 14. The branch 3 connects with the chamber 15 formed between the cap 14 and the diaphragm 13 and this chamber can contain a light spiral compression spring 16 which biases the diaphragm 13 toward the demand chamber 10. The diaphragm 13 is shown as carrying metal disk 18 adapted to engage a knob 19 on the end of a valve stem 20. This valve stem extends through the central aperture 21 of a metal disk 22 across the bore 9 and connects with a cap shaped valve head 23 which seats against the high pressure side of the disk 22. A spiral compression spring 25 normally holds the stem in the position shown in which the valve head 23 is in full engagement with the disk 22 under which condition no high pressure oxygen escapes from the line 11 into the demand chamber 10. On inhalation by the aviator, however, the pressure in the demand chamber is reduced so that the diaphragm 13 engages and tilts the valve stem 20 to tip the valve head 23 and permit high pressure oxygen to flow from the supply line 11 to the demand chamber 10 and thence to the aviator's mask.

The aneroid valve 5 embodying the present invention includes a hollow metal casing 30 the internal chamber 31 of which is in constant communication with the atmosphere through a vent 32. Within the chamber 31 is arranged a bellows 33 having its tubular side wall 34 provided with annular corrugations and having end heads 35 and 36. To the inner face of the end head 35 is fixed a disk 38 carrying a stop pin 39 which projects toward the end head 36 and serves to limit the contracting movement of the bellows, the bellows being evacuated. This disk 38 also carries a pin 40 projecting through the end head 35 and supporting a poppet valve head 41 and a guide stem 42 projecting coaxially from the valve head 41. The valve head 41 is provided with a facing 43 adapted to engage the end of a tube 44 which forms a valve seat 45. The end of the tube 44 opposite its seat 45 is fixed to the valve casing 30 and communicates with the branch 4 of the line 1 through which oxygen is constantly being bled past the restricted orifice 2. The stem 42 is slidably guided in a guideway 46 suitably supported at the center of the tube 44 as shown.

A helical compression spring 50 is arranged within the bellows 33 and serves to yieldingly bias the end heads 35, 36 thereof to their extended condition. The aneroid valve is shown as being adjustable and for this purpose a coaxial adjusting screw 51 projects from the end head 36 through a threaded opening 52 in the casing 30, a lock nut 53 being provided to secure the screw 51 in any selected position of adjustment.

In the operation of the device it will be assumed that oxygen under a gage pressure of say 70 pounds is being supplied to the lines 1 and 11 and that the demand outlet line 12 connects with the mask (not shown) of the aviator. At altitudes below about 35,000 feet the demand valve 7 is referred to ambient pressure. Thus at such lower altitudes the chamber 15 is in communication with the atmosphere through the branches 3 and 4 of the oxygen supply line 1, tube 44 and through the chamber 31 and vent 32, the valve head 41 being unseated at this time. However, a small amount of oxygen, say, 20 cubic centimeters per minute, is constantly being bled through the restricted orifice 2, oxygen escaping through the branch 44, and past the open poppet valve head 41 through the chamber 31 and its vent 32.

As the airplane rises in altitude the ambient pressure within the chamber 31 decreases, this causing the evacuated bellows 33 to expand axially. When the ambient pressure drops to the critical value of 3.4 p.s.i.a. the bellows 33 expand sufficiently to seat the poppet valve head 41 against the annular valve seat 45 thereby to isolate the system from ambient pressures. The oxygen bleeding into the apparatus past the orifice 2 builds up the pressure in the branches 3 and 4 and hence in the chamber 15 to supply a higher than ambient reference pressure for the demand valve 7. When this reference pressure produced by the high pressure oxygen exceeds the assumed 3.4 p.s.i.a. the poppet valve head is pushed open by this pressure permitting the oxygen to escape through the chamber 31 and vent 32 to the atmosphere. Accordingly a substantially constant reference pressure is maintatined in the chamber 15 by the high pressure oxygen bleeding through the restricted orifice 2 at all altitudes above the assumed 35,000 feet.

The present invention is primarily concerned with the effect of a puncture of the wall of the bellows 33 and in assuring that excessively high pressures cannot develop in the breathing apparatus or pressure suit as a result of the reference pressure in the chamber 15 rising toward assumed 70 pounds oxygen line pressure. When the bellows 33 is punctured the vacuum therein is lost and the spring 50 immediately extends the bellows so as to cause the poppet valve head 41 to close. Accordingly the oxygen bleeding through the restricted orifice 2 causes a rise in the reference pressure within the chamber 15. However this rise is limited by the poppet valve head 41 which opens against the resistance of the spring 50 when this reference pressure exceeds a predetermined maximum and permits oxygen to escape through the chamber 31 and vent 32 to the atmosphere. It will be seen that when the bellows 33 is punctured, the pressure within the branches 3 and 4 and chamber 15 cannot exceed the value determined by the effective area of the poppet valve head 41 and the spring 50, thereby to avo.d the danger of an excessive build up of suit or mask pressure from this cause and blow out of any part of the apparatus. While a safety relief valve could prevent such blow outs addition of such a relief valve would increase the danger of leakage and is not desirable.

From the foregoing it will be seen that the present invention provides a very simple safety aneroid valve which, when used for the purpose for which it is designed, positively prevents the build up of an excessive su.t or mask pressure even when the bellows forming part of the aneroid valve is accidentally punctured.

I claim:

An aneroid valve for maintaining a substantially minimum pressure in apparatus being served, comprising a source of gas under pressure, a supply conduit connecting and supplying gas under pressure from said source to said apparatus, means providing a restriction limiting the flow of gas through said conduit, a branch conduit connecting said supply conduit, intermediate said restriction means and said apparatus being served, with the atmosp.ere, a valve seat at the atmospheric end of said branch conduit and facing the atmosphere, an evacuated bellows externally subject to ambient pressure, means supporting said bellows for expansion and contraction toward and from said valve seat, a valve head fast to the outboard end of said bellows in position to be moved into and out of engagement with said valve seat, and spring means in said bellows biasing said valve head toward said valve seat whereby upon reduction of ambient pressure said spring means expands said valve head toward said valve seat to restrict the escape of gas from said branch conduit to the atmosphere, and whereby in the event said bellows is punctured excessive pressure in said supply conduit will open said valve head against the resistance of said spring means and permit the escape of gas to the atmosphere.

References Cited in the file of this patent

UNITED STATES PATENTS

| | | |
|---|---|---|
| 2,437,462 | Frye | Mar. 9, 1948 |
| 2,452,670 | Meidenbauer | Nov. 2, 1948 |
| 2,630,129 | Holmes | Mar. 3, 1953 |
| 2,755,799 | Marty | July 24, 1956 |
| 2,867,227 | Meidenbauer | Jan. 6, 1959 |

FOREIGN PATENTS

| | | |
|---|---|---|
| 637,255 | France | Jan. 24, 1928 |